United States Patent

Nosaki

(10) Patent No.: US 10,097,626 B2
(45) Date of Patent: Oct. 9, 2018

(54) COOPERATION SYSTEM

(71) Applicants: KABUSHIKI KAISHA TOSHIBA, Tokyo (JP); TOSHIBA TEC KABUSHIKI KAISHA, Tokyo (JP)

(72) Inventor: Takefumi Nosaki, Odawara Kanagawa (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 208 days.

(21) Appl. No.: 14/854,180

(22) Filed: Sep. 15, 2015

(65) Prior Publication Data

US 2016/0094634 A1 Mar. 31, 2016

(30) Foreign Application Priority Data

Sep. 25, 2014 (JP) ................. 2014-195073

(51) Int. Cl.
| | | |
|---|---|---|
| G06F 15/16 | (2006.01) | |
| H04L 29/08 | (2006.01) | |
| H04N 1/00 | (2006.01) | |
| H04L 29/06 | (2006.01) | |

(52) U.S. Cl.
CPC ..... H04L 67/1002 (2013.01); H04N 1/00204 (2013.01); H04N 1/00244 (2013.01); H04L 63/105 (2013.01); H04N 2201/0094 (2013.01)

(58) Field of Classification Search
CPC ...................................................... H04L 65/60
USPC ......................................................... 709/232
See application file for complete search history.

(56) References Cited

U.S. PATENT DOCUMENTS

| | | | | |
|---|---|---|---|---|
| 7,349,951 | B2* | 3/2008 | Clough | ................. G06F 3/1204 709/203 |
| 8,711,397 | B2 | 4/2014 | Kiuchi | |
| 2002/0059489 | A1* | 5/2002 | Davis | .................... G06F 3/1285 710/72 |
| 2011/0307442 | A1* | 12/2011 | Sharma | ............. G06F 17/30174 707/611 |
| 2012/0314608 | A1 | 12/2012 | Okuno et al. | |
| 2014/0029047 | A1* | 1/2014 | Giannetti | ............. G06F 3/1212 358/1.15 |
| 2014/0244839 | A1* | 8/2014 | Yoon | ................... H04L 43/0811 709/224 |

(Continued)

FOREIGN PATENT DOCUMENTS

| | | |
|---|---|---|
| JP | 2010-003035 | 1/2010 |
| WO | 2011/101902 | 8/2011 |

OTHER PUBLICATIONS

Japanese Office Action dated Mar. 20, 2018, filed in counterpart Japanese Patent Application No. 2014-195073 (6 pages) (with machine translation).

*Primary Examiner* — Hamza N Algibhah
(74) *Attorney, Agent, or Firm* — Patterson & Sheridan, LLP

(57) ABSTRACT

A cooperation system in cooperation with a cloud system includes: a server connected to a local network; and an image processing apparatus connected to the local network, the image processing apparatus being configured to send processing-target data to the server, and to receive processed data from the server, the processed data being obtained by processing the processing-target data by one of the server and the cloud system.

15 Claims, 14 Drawing Sheets

(56) References Cited

U.S. PATENT DOCUMENTS

2016/0077901 A1* 3/2016 Roth .................. G06F 9/45529
719/328

* cited by examiner

CLOUD-SYSTEM CONNECTIVITY CONFIRMATION TABLE

1. : 1 second
2. : 5 seconds
3. : 10 seconds

Fig.9

RESOURCE-MANAGING TABLE (RT)
  TOTAL NUMBER OF CORES      : C_a
  TOTAL NUMBER OF ACC CORES  : ACC_a
  TOTAL MEMORY VOLUME        : M_a

OPERATION RESOURCE
  PROCESSED JOB                  : J_b
  NUMBER OF OPERATING CORES      : C_b
  NUMBER OF OPERATING ACC CORES  : ACC_b
  MEMORY FOR EACH OPERATION      : M_b

RESOURCE REMAINING AMOUNT
  NUMBER OF EXECUTALE JOBS         : J_r
  NUMBER OF REMAINING CORES        : C_r
  NUMBER OF REMAINING ACC CORES    : ACC_r
  REMAINING MEMORY                 : M_b

STATUS OF WATING FOR RESOURCES TO BECOME AVAILABLE
  NUMBER OF JOBS WAITING FOR
  RESOURCES TO BECOME AVAILABLE: J_r

Fig.11

COOPERATION SYSTEM

CROSS-REFERENCE TO RELATED APPLICATION

This application is based upon and claims the benefit of priority from the prior Japanese Patent Application No. 2014-195073, filed on Sep. 25, 2014, the entire contents of which are incorporated herein by reference.

FIELD

The embodiment described herein generally relates to a cooperation system in which an image processing apparatus and a cloud system execute processing in cooperation with each other.

BACKGROUND

An image processing apparatus, e.g., an MFP (Multifunction Peripheral), is capable of executing processing in cooperation with a cloud system when the MFP is incapable of executing the processing by using the limited resources of the MFP.

Further, a system including a relay server between an MFP and a cloud system is known. According to this system, if the MFP cannot connect to the cloud system because of network failure or concentration of loads, the relay server stores image data (for example, scan-image data) in place of the cloud system, or secondarily stores copies of image data stored in the cloud system.

However, according to the technology of the prior art, the relay server only has a function of storing and accumulating data alternatively. So, if network failure or concentration of loads occurs, this system is not capable of executing processing, which requires large processor resources, such as high-image-quality processing and various high-speed processing, in cooperation with the cloud system.

BRIEF DESCRIPTION OF THE DRAWINGS

FIG. 9 is a threshold data table used to confirm connectivity with the cloud system according to this embodiment.

FIG. 11 is a diagram showing a managing data table used to manage assignment of the resources according to this embodiment.

DETAILED DESCRIPTION

Figure 1:
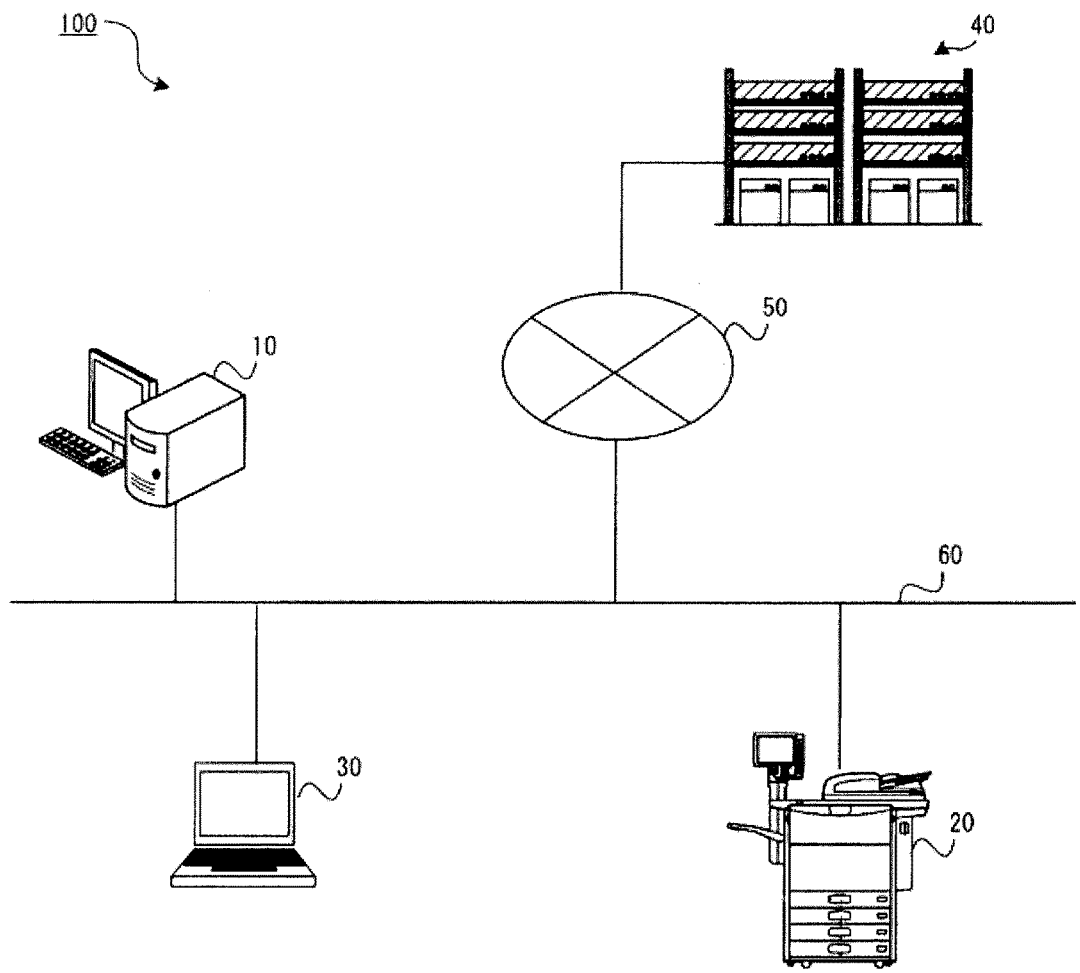
FIG. 1 is a diagram schematically showing an example of the entire configuration of a cloud cooperation system according to this embodiment.

According to an embodiment, a cooperation system includes a server and an image processing apparatus.

The server is connected to a local network.

The image processing apparatus is connected to the local network, to which the server is connected. The image processing apparatus is configured to send processing-target data to the server or to the cloud system via the server, and to receive processed data from the server or the cloud system, the processed data being obtained by processing the processing-target data by one of the server and the cloud system.

According to an embodiment, there is provided a server configured to relay processing-target data exchanged between an image processing apparatus and a cloud system. The server includes a processor, an accelerator, and a memory. The accelerator is configured to process the processing-target data. The memory stores a program for processing the processing-target data. The processor is configured to determine possibility of processing the processing-target data by the accelerator, if it is possible for the accelerator to process the processing-target data, to cause the accelerator to process the processing-target data, and if it is impossible for the accelerator to process the processing-target data, to process the processing-target data based on the program.

In general, an MFP (Multifunction Peripheral), i.e., an image processing apparatus, is connected to client PCs (Personal Computers) and a file server in an office, and works.

Meanwhile, a cloud system on the Internet is shared by a large number of users.

The cloud system executes various kinds of processing, which require large resources of CPUs (Central Processing Units) of individual systems, in place of the individual systems.

Users can enjoy benefits of shorter processing time and the like by using the cloud system. Further, users can enjoy services such as provision of a wide variety of functions and provision of new functions using shared resources.

However, once network failures or concentration of loads on the network occurs, then users cannot enjoy the benefits and the functions to be provided.

In view of the above-mentioned circumstances, according to this embodiment, it is desirable for users of an MFP to enjoy the benefits and the functions of a cloud system by using a local server between the cloud system and the MFP.

If provision of functions from the cloud system is down, then the local server alternatively provides the functions the same as the functions of the cloud system to the MFP to thereby support processing requests from the MFP.

Although the processing performance of the local server is lower than the processing performance of the cloud system, it is possible to continue the processing by alternatively providing the functions by the local server.

Further, a user of the MFP may select the cloud system or the local server to process.

Once the local server provides functions, then the local server sends data on processing results such as processed data and a message to the MFP side.

As a result, it is possible to ease restrictions on the use of the MFP by a user.

The functions similar to the functions of the local server may be realized by providing the functions of the local server to the MFP.

Hereinafter, an embodiment will be further described with reference to the drawings. In the drawings, the same reference symbols show the same or similar components.

FIG. 1 is a diagram schematically showing a cloud cooperation system of this embodiment.

The cloud cooperation system 100 includes the local server 10 (hereinafter, simply referred to as server 10), the MFP 20, the PC 30, and the cloud system 40.

The server 10, the MFP 20, and the PC 30 are connected via the LAN (Local Area Network) 60.

Further, the cloud system 40 is connected to the LAN 60 via the Internet 50, i.e., an external network.

Figure 2A:
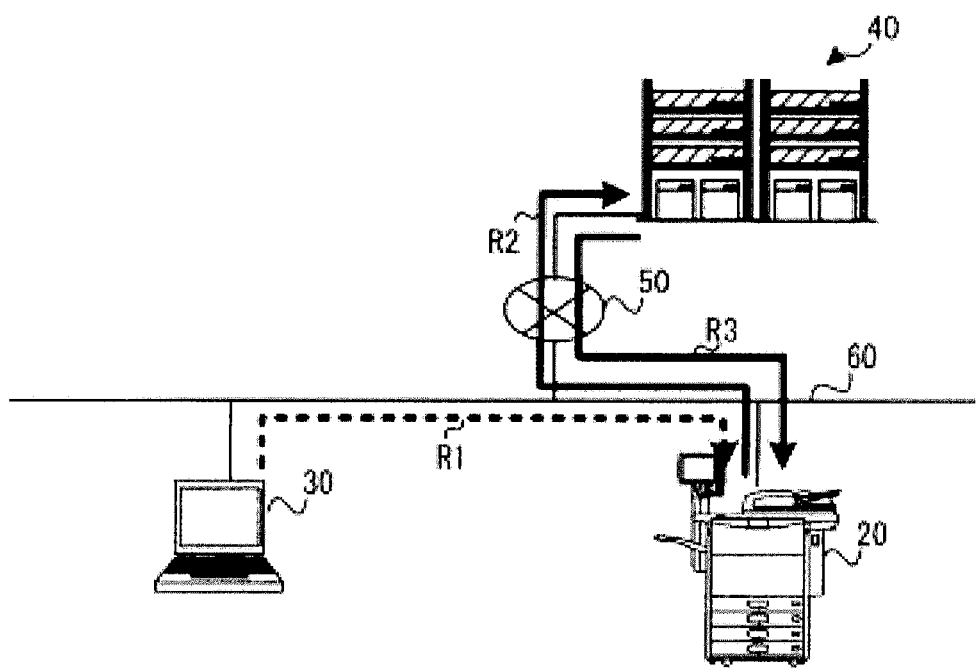
FIG. 2A is a diagram showing a cooperation flow according to this embodiment.
Figure 2B:
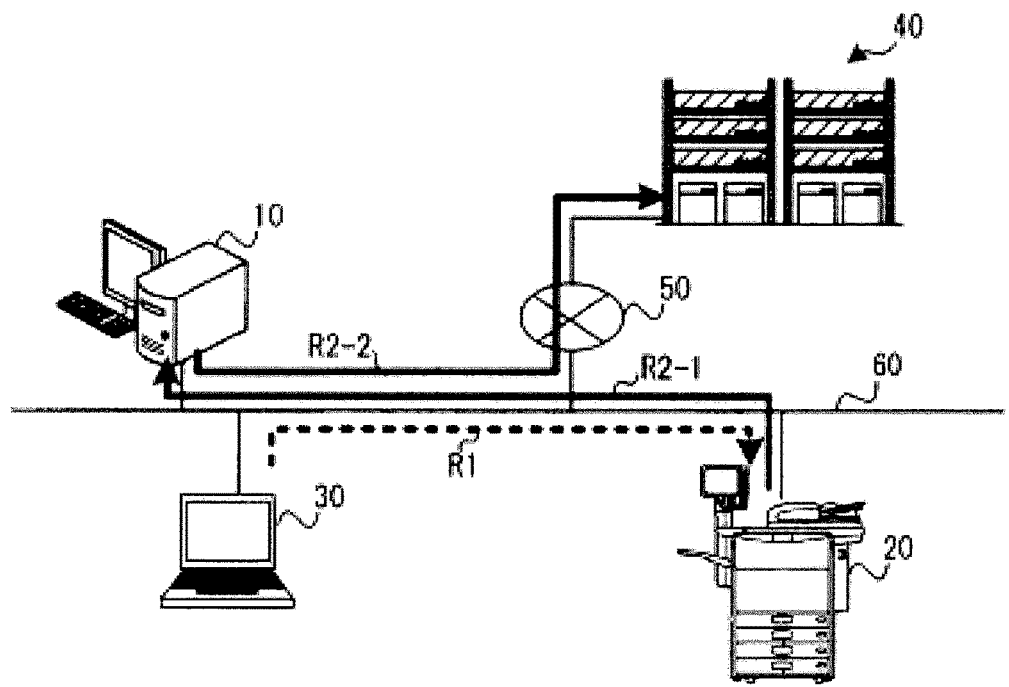
FIG. 2B is a diagram showing a cooperation flow according to this embodiment.
Figure 2C:
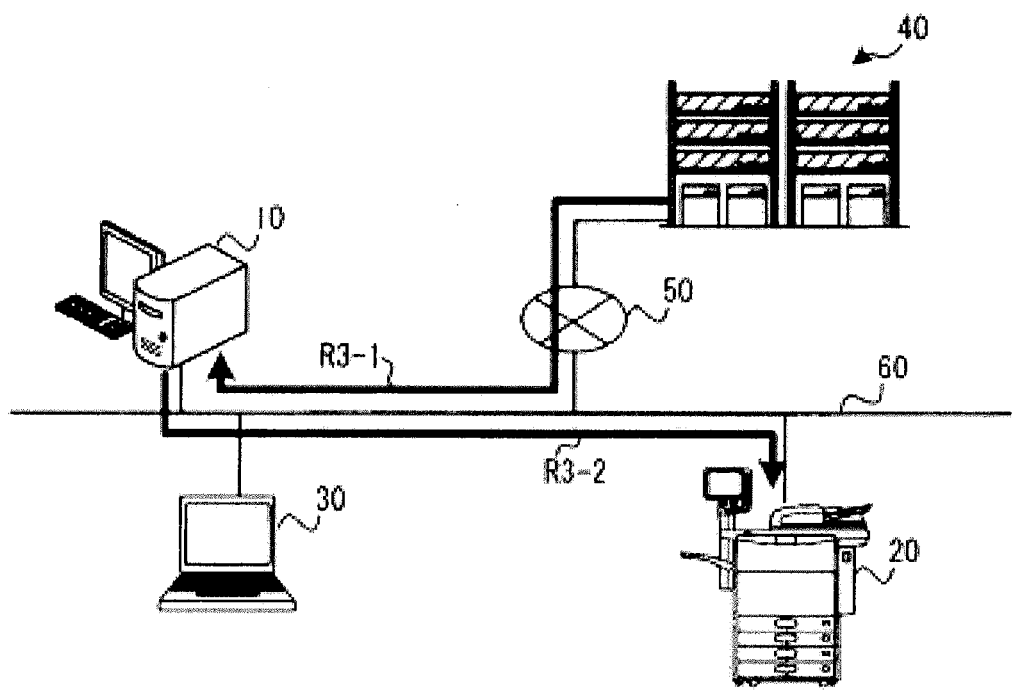
FIG. 2C is a diagram showing a cooperation flow according to this embodiment.

FIG. 2A to FIG. 2C are diagrams showing a cooperation flow (data flow) of this embodiment.

First, print processing will be described with reference to FIG. 2A.

In a cloud system of a prior art, the PC 30 sends high-load print-image data (processing-target data) to the MFP 20 (path R1).

After that, the print-image data is sent to the cloud system 40 via the Internet 50 via the path R2.

The cloud system 40 decompresses and processes the print-image data, and sends back the print-image data to the MFP 20 via the path R3. The MFP 20 prints and outputs the processed print-image data.

However, if the cloud system fails to respond because of any failure when the print-image data is being sent or processed, the user of the PC 30 has to wait or operate the PC 30 to cancel printing on the way, for example.

In view of the above, according to this embodiment, the cloud cooperation system 100 has the server 10 between the MFP 20 and the cloud system 40, i.e., on the LAN 60 that has the MFP 20. Even if the cloud system 40 cannot respond, the server 10 plays a role of the cloud system 40 instead.

How the cooperation system of this embodiment behaves will be described with reference to FIG. 2B and FIG. 2C.

The MFP 20 sends the processing-target data (print-image data) received via the path R1 of FIG. 2B to the server 10 (FIG. 2B, path R2-1) instead of sending to the cloud system 40.

The server 10 sends the received print-image data to the cloud system 40 via the path R2-2.

At this time, if the server 10 does not receive a response from the cloud system 40, the server 10 stops sending the print-image data, and processes the print-image data by using the resources of the server 10.

The server 10 returns the print-image data, which is processed by using the resources of the server 10, to the MFP 20 via the path R3-2 of FIG. 2C.

The MFP 20 prints and outputs the processed print-image data received.

Meanwhile, if the cloud system 40 responds and the cloud system 40 processes the print-image data without any problem, the server 10 receives the processed print-image data from the cloud system 40 via the path R3-1 of FIG. 2C, and transfers the processed print-image data to the MFP 20 via the path R3-2. The MFP 20 prints and outputs the processed print-image data received.

Next, the behavior when a user uses an operation panel of the MFP 20 to execute scan processing will be described with reference to FIG. 2 again.

Note that the MFP 20 has a scanning function. However, the cloud system 40 executes high-image-quality processing, high-compression processing, and the like, which require high CPU performances, at high speed. As a result, a wait time of a user of the MFP 20 may be reduced.

In the scan processing mode of a prior art, similar to the above-mentioned print processing, the MFP 20 sends scan-image data (processing-target data) read by a scanner to the cloud system 40 (FIG. 2A, R2), and the cloud system 40 returns the processed scan-image data to the MFP 20 via the path R3.

However, the network 50, for example, between the LAN 60 and the cloud system 40 is sometimes down, or a high load is sometimes applied to the cloud system 40. Then it may be difficult for the cloud system 40 to always respond at high speed.

In view of this, according to the cloud cooperation system 100 of this embodiment, as described above, the server 10 on the LAN 60 copes with the network 50 that is down and the high-load cloud system 40.

Hereinafter, description will be made with reference to FIG. 2B and FIG. 2C. The MFP 20 scans scan-image data, and sends the scan-image data from the MFP 20 to the server 10 via the path R2-1 of FIG. 2B.

The server 10 sends the scan-image data to the cloud system 40 connected via the network 50 via the path R2-2 of FIG. 2B.

The cloud system 40 processes the scan-image data, and returns the processed scan-image data to the server 10 via the path R3-1 of FIG. 2C.

The server 10 transfers the processed scan-image data to the MFP 20 via the path R3-2 of FIG. 2C.

Meanwhile, if the server 10 receives no response from the cloud system 40, the server 10 processes the scan-image data by using the resources of the server 10 instead, and returns the processed scan-image data to the MFP 20 via the path R3-2 of FIG. 2C.

Figure 3:
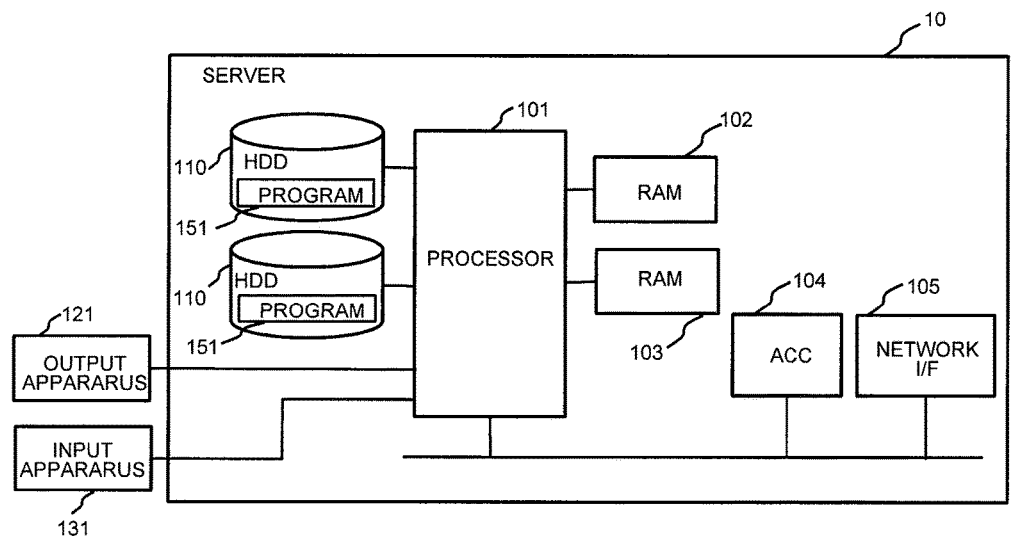
FIG. 3 is a block diagram showing an example of the configuration of the server according to this embodiment.

FIG. 3 is a diagram showing an example of an internal configuration of the server 10.

The server 10 includes the processor 101 configured to control the server 10.

The processor 101 has a SoC (System-on-a-chip) configuration including peripheral circuits and a multicore configuration.

The server 10 includes the RAM (Random Access Memory) 102, i.e., a volatile memory used as a work area, and the ROM (Read only Memory) 103 storing program data used when booting.

Further, the server 10 includes the HDDs (Hard Disk Drives) 110 storing application programs, received image data, and data to send.

The server 10 includes the accelerator 104 (hereinafter referred to as the ACC 104) to increase the calculation performance. The ACC 104 includes a GPGPU (General Purpose Graphic Processing Unit).

Further, the server 10 includes the network I/F 105 to connect to the LAN.

The server 10 further includes the output apparatus 121 and the input apparatus 131. A system manager or the like uses the output apparatus 121 and the input apparatus 131 to change the settings of the server 10, to check operation, and the like.

Note that, the plurality of HDDs 110 are connected to the processor 101 to increase the storage volume.

Further, the ACC 104 is a general-purpose expansion bus including board-type expansion units such as PCIe (PCI Express) to support various configurations. The board-type expansion units are exchangeable and expandable.

Further, the application programs 151 are previously installed or optionally installed in the HDDs 110.

The program 151 includes an algorithm realizing an OCR (Optical Character Recognition) function, for example.

The processor 101 executes the program 151 to thereby OCR-process, for example, scan-image data, i.e., processing-target data, and search certain keywords for the scan-image data.

The certain keywords are words to identify data as one that should not be presented to anyone outside of the company, and previously set and registered. Examples of the certain keywords include texts such as "confidential" and "internal use only", company's names, personal information, and the like.

The server 10 receives processing-target data, and then determines if the processing-target data contains the set and registered certain keywords or not.

Here, if the server 10 determines that the certain keywords are not contained, the server 10 transfers the processing-target data to the cloud system 40. Further, if the server 10 determines that the certain keywords are contained, the server 10 processes the processing-target data by using the resources of the server 10.

Figure 4:
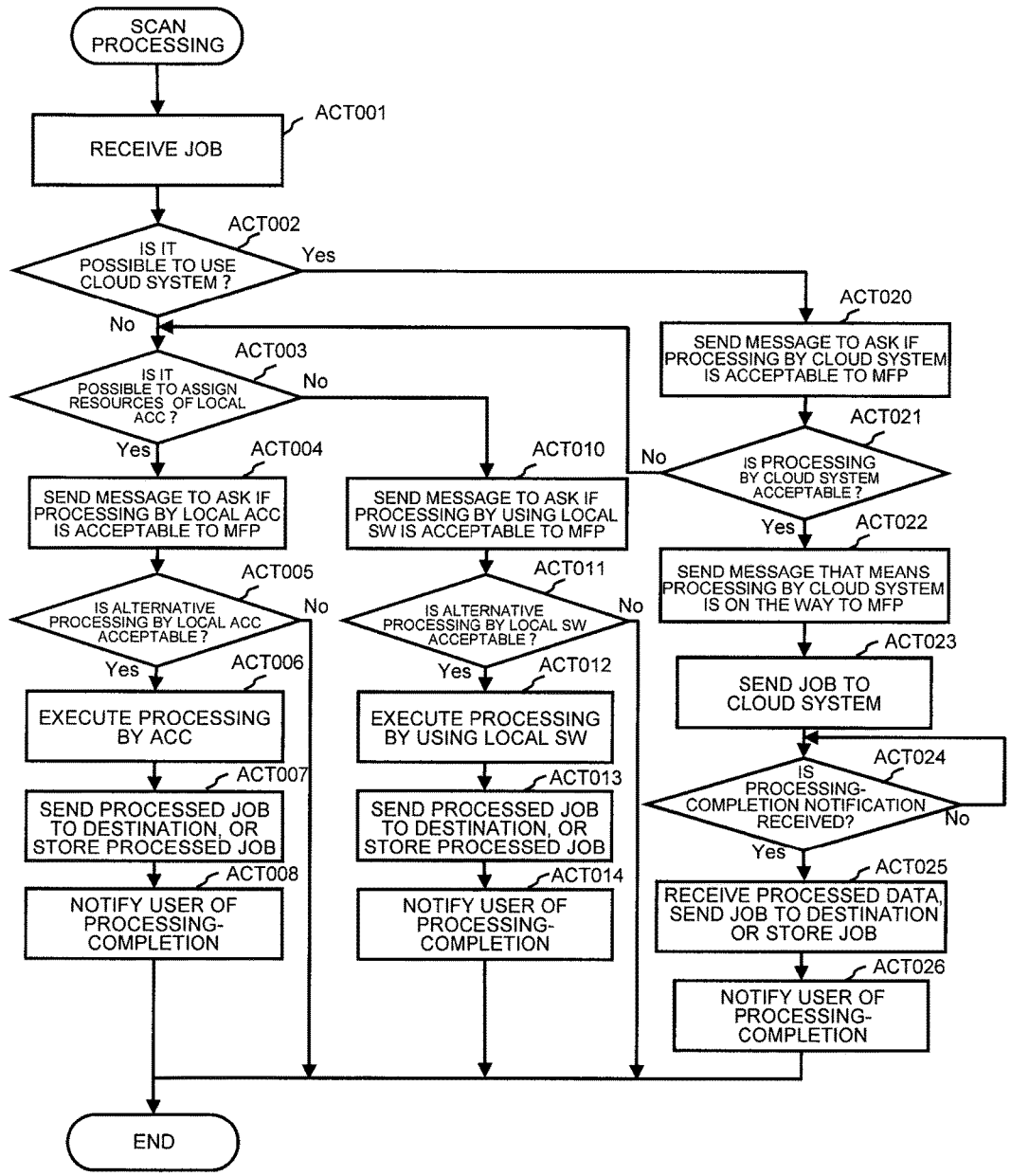
FIG. 4 is a flowchart showing an example of the behavior in scan processing according to this embodiment.

FIG. 4 is a flowchart showing an example of the behavior of the server 10 in the above-mentioned scan processing. Note that the processor 101 of the server 10 decompresses the program 151 in the RAM 102, calculates the program 151, and cooperates with various kinds of hardware to thereby realize the following behaviors described with reference to the flowchart.

In ACT001, the server 10 receives a job (scan-image data, i.e., processing-target data) from the MFP 20 via the network I/F 105.

In ACT002, the processor 101 determines if it is possible to use the cloud system 40 or not.

If the processor 101 receives a response that means it is possible to use the cloud system 40 from the cloud system 40, the processor 101 determines that it is possible to use the cloud system 40.

If it is possible to use the cloud system 40 (ACT002, Yes), in ACT020, the processor 101 sends a message to ask if processing by the cloud system 40 is acceptable or not to the MFP 20 (user of the MFP 20).

In ACT021, the processor 101 confirms if a response that means affirmative from the user of the MFP 20 is received from MFP 20 via the network I/F 105 or not.

If an affirmative response is received (ACT021, Yes), in ACT022, the processor 101 sends a message that means processing is on the way to the MFP 20.

In ACT023, further, the processor 101 sends the scan-image data, i.e., processing-target data, to the cloud system 40 via the network I/F 105.

In ACT024, the processor 101 stands by until the processor 101 receives a signal that shows completion of processing of the scan-image data from the cloud system 40 (ACT024, No, loop).

Meanwhile, in ACT021, if the processor 101 receives a response that means use of the cloud system 40 is not allowed by the MFP 20 (user of the MFP 20) (ACT021, No), the server 10 then starts the operation of ACT003.

Further, in ACT024, if the processor 101 receives the processed scan-image data from the cloud system 40 (ACT024, Yes), the server 10 then starts the operation of ACT025. In ACT025, the processor 101 transfers the processed scan-image data, which is processed as a scan job, to a preset destination, or stores the processed scan-image data in the HDD 110.

Figure 6:
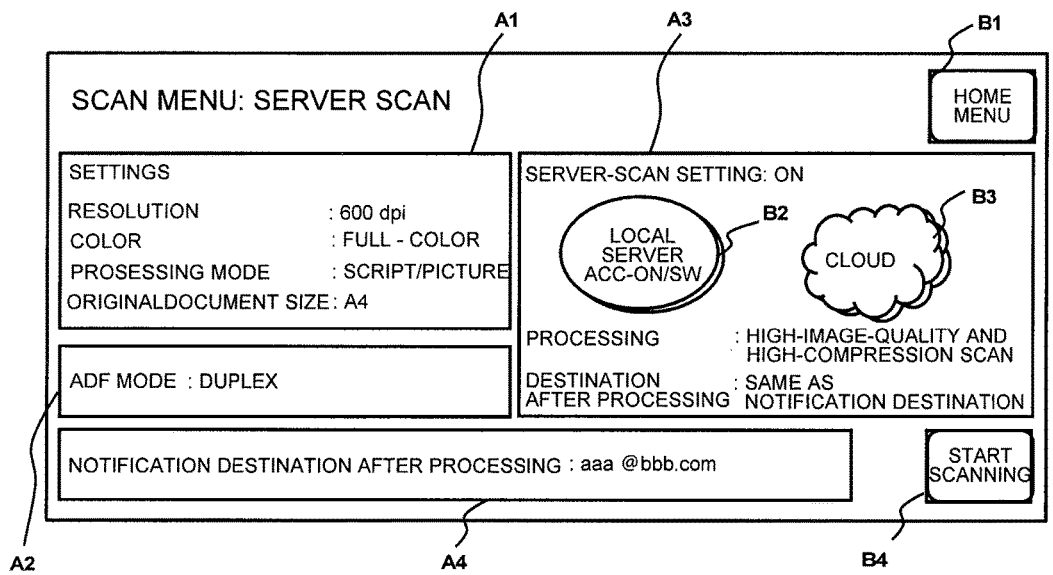
FIG. 6 is an example of what is displayed for scan processing according to this embodiment.

In ACT026, the processor 101 controls the network I/F 105, and notifies the MFP 20 (user of the MFP 20) or a processing-completion-notification destination displayed on the setting area A4 of FIG. 6 that the scan-image data is processed.

Further, in the above-mentioned ACT002, if the processor 101 determines that the cloud system 40 cannot be used because of any matter (ACT002, No), the server 10 then starts the operation of ACT003.

In ACT003, the server 10 alternatively processes the scan-image data in place of the cloud system 40. In other words, the processor 101 determines if it is possible to assign the resources of the ACC 104 or not in order to put first priority on high-speed processing.

If it is possible to assign the resources of the ACC 104 (ACT003, Yes), the server 10 then starts the operation of ACT004.

In ACT004, the processor 101 sends a message to ask if processing by the ACC 104 is acceptable to the MFP 20 (user of the MFP 20). After the processor 101 sends a confirmation message to the MFP 20, the server 10 then starts the operation of ACT005.

In ACT005, the processor 101 determines if an affirmative response that means processing by the ACC 104 is acceptable is received from the MFP 20 (user of the MFP 20) or not. If an affirmative response that means processing by the ACC 104 is acceptable is received from the MFP 20 (user of the MFP 20) (ACT005, Yes), the server 10 then starts the operation of ACT006.

In ACT006, the processor 101 controls the ACC 104 to thereby alternatively process the scan-image data as described above. After the processor 101 receives the processed scan-image data from the ACC 104, the server 10 then starts the operation of ACT007.

In ACT007, the processor 101 sends the processed scan-image data, which is processed as a scan job, to the preset destination, or stores the processed scan-image data, which is processed as a scan job, in the HDD 110.

Further, in ACT008, the processor 101 controls the network I/F 105, and notifies the MFP 20 (user of the MFP 20) or a processing-completion-notification destination displayed on the setting area A4 of FIG. 6 that the scan-image data is processed.

Further, in ACT003, if it is impossible to assign the resources of the ACC 104 (ACT003, No), the server 10 then starts the operation of ACT010.

In ACT010, the processor 101 asks the MFP 20 (user of the MFP 20) to confirm if the alternative processing by using the software of the server is acceptable. For example, the processor 101 sends a message to the MFP 20 (user of the MFP 20) to confirm if processing by using software is acceptable. After the processor 101 sends the confirmation message to the MFP 20, the server 10 then starts the operation of ACT011.

In ACT011, the processor 101 determines if an affirmative response that means processing by using software is acceptable is received from the MFP 20 (user of the MFP 20) or not. If an affirmative response that means processing by using software is acceptable is received from the MFP 20 (user of the MFP 20) (ACT011, Yes), the server 10 then starts the operation of ACT012.

In ACT012, the processor 101 alternatively processes the scan-image data by using the software of the server 10 instead of the ACC 104. At this time, the processor 101, for example, loads the program 151 and processes the scan-image data. After the alternative processing by using the software is completed, the server 10 then starts the operation of ACT013.

In ACT013, the processor 101 sends the processed scan-image data, which is processed as a scan job, to the preset destination, or stores the processed scan-image data, which is processed as a scan job, in the HDD 110.

Further, in ACT014, the processor 101 controls the network I/F 105, and notifies the MFP 20 (user of the MFP 20) or a processing-completion-notification destination displayed on the setting area A4 of FIG. 6 that the scan-image data is processed.

In the above-mentioned ACT005 and ACT011, if an affirmative response is not received from the MFP 20 (user of the MFP 20) (ACT005, No, ACT011, No), the server 10 finishes the processing.

Further, in the above-mentioned ACT021, if an affirmative response in using the cloud system 40 is not received from the MFP 20 (user of the MFP 20) (ACT021, No), the reason is as follows. For example, this is for a security reason if the scan-image data, i.e., processing-target data, is confidential data or the like.

Figure 5:
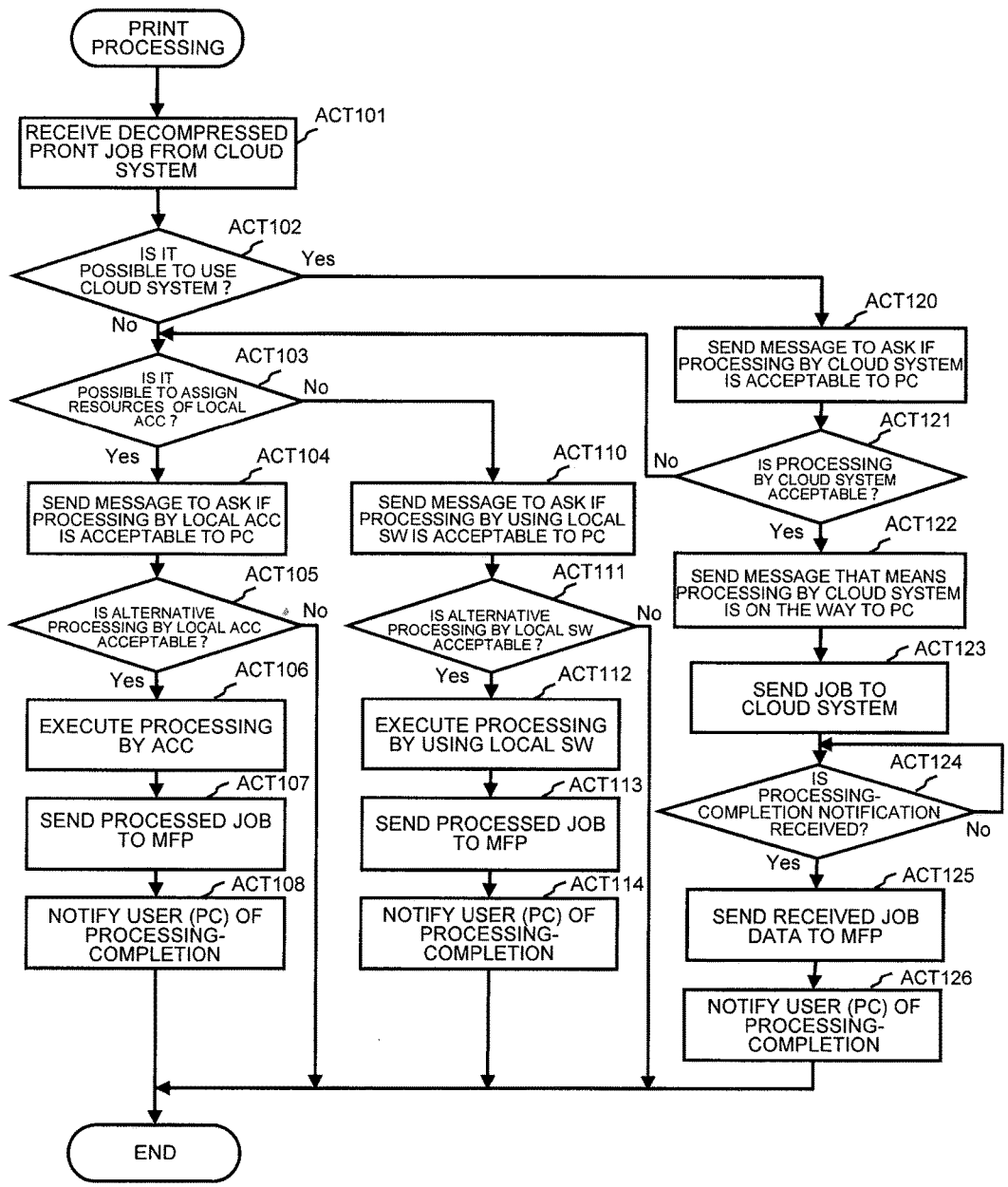
FIG. 5 is a flowchart showing an example of the behavior in print processing according to this embodiment.

FIG. 5 is a flowchart showing an example of the behavior of the server 10 in print processing.

When a user of the PC 30 wants to print print-image data, of which decompression load is probably high, he may select decompression of print-image data by the cloud system 40.

Most of the operations of the print processing of FIG. 5 are similar to the operations of the scan processing described with reference to FIG. 4. However, the destination of inquiry messages and the like is not the MFP 20 but the PC that the user currently uses (ACT104, ACT108, ACT110, ACT114, ACT120, ACT122, ACT126).

Further, the cloud system 40 or the server 10 processes print-image data and sends the processed print-image data to the MFP 20, and the MFP 20 prints the processed print-image data on a sheet (ACT107, ACT113, ACT125).

The operations other than the above-mentioned operations are similar to the operations of the scan processing of FIG. 4. So description of the print processing of FIG. 5 will be omitted.

Note that, if the cloud system 40 should not process print-image data for a security reason and from a viewpoint of prevention of leakage of information, the server 10 may notify the user of the PC 30 of that fact and may not allow the user of the PC 30 to select processing by the cloud system 40.

If it is impossible to use the cloud system 40 because of a network failure, concentration of a network load, and the like, if it is impossible to use the cloud system 40 for the above-mentioned security reason, and the like, the server may process print-image data by using the resources assigned to the ACC 104 or may process print-image data by using the multicore processor 101 and software.

FIG. 6 is an example of a menu window for scan processing displayed on the operation panel (touch panel) of the MFP 20.

The user of the MFP 20 selects the scan menu on the home menu of the MFP 20, and the menu of FIG. 6 is thereby displayed on the operation panel of the MFP 20. Further, the user of the MFP 20 touches and operates the plurality of menus displayed on the scan menu window of FIG. 6 to input various setting operations.

The button B1 to return to the home menu is displayed at the upper right of the scan menu window.

Further, the setting area A1 for basic settings (resolution, full-color/black-and-white, image-processing mode, original-document size) for scan processing is displayed at the left of the scan menu window.

The user of the MFP 20 touches and operates the setting area A1 to input various settings as necessary.

Further, the setting area A2 for setting the ADF mode is displayed at the left of the scan menu window. The user of the MFP 20 touches and operates the setting area A2 to select to scan one side or the both sides of original-documents.

Further, the setting area A3 for server setting (server-scan setting) for scan processing is displayed at the left of the scan menu window. The user of the MFP 20 touches and operates the setting area A3 to select ON/OFF of processing by the server 10.

If the server-scan setting is ON, the server 10 or the cloud system 40 processes scan-image data under this setting.

If the server-scan setting is OFF, the MFP 20 processes scan-image data under this setting.

Further, in the setting area A3, a processing mode may be set, and the destination of processed scan-image data may be set. Further, the setting area A3 may display the processing status of the server 10 and messages.

The menu-selection buttons B2 and B3 for setting a local server and a cloud system are further displayed on the setting area A3.

The user of the MFP 20 may select, by pressing one of the buttons B2 and B3, one of the server 10 and the cloud system 40 to process scan-image data.

One of the buttons B2 and B3 is exclusively pressed. If the button B3 is pressed, the cloud system 40 preferentially processes scan-image data according to the flowchart of FIG. 4.

Meanwhile, if the button B2 is pressed because scan-image data is confidential data or due to other reasons, only the server 10 processes the scan-image data.

Note that, if the cloud system 40 processes scan-image data, the MFP 20 may not send processing-target data (scan-image data) to the cloud system 40 via the server 10 but may directly send processing-target data to the cloud system 40 (cooperation flow of FIG. 2A).

The setting area A4 for setting a notification destination after processing is displayed at the bottom of the scan menu window.

The user of the MFP 20 may set a notification destination after processing is on the setting area A4.

An email address or an identification information of a predetermined file server are set as the notification destination.

If an email address is set as the notification destination, the user of the MFP 20 may receive a notification, i.e., email, when processing is completed.

In general, the MFP 20 identifies a user by using a magnetic card, a wireless ID card, or user authentication, and displays the value of the preset notification destination at this time. In addition, the user is allowed to manually input, change, and add the notification destination.

Note that, in the various settings set in the setting area A1 of the scan menu window of FIG. 6, "600 dpi" is set for the resolution, "full-color" is set for the color, "script/picture" is set for the processing mode, and "A4" is set for the original-document size.

In the setting area A2, "duplex" is set for the ADF mode.

In the setting area A3, "ON" is set for the server-scan setting, "high-image-quality and high-compression scan" is set for the processing, and "same as notification destination" is set for the notification destination after processing.

In the setting area A4, "aaa@bbb.com" is set for the processing-completion-notification destination.

After the user of the MFP 20 completes the necessary settings on the scan menu window, the user of the MFP 20 presses the start-scanning button B4 at the lower right of the scan menu window of FIG. 6.

The MFP 20 starts to scan original-documents mounted on the ADF.

Based on the scan settings, the MFP 20 sends scan-image data to the cloud system 40 via the server 10, and causes the cloud system 40 to process scan-image data. Alternatively, the MFP 20 may alternatively cause the server 10 to process scan-image data in place of the cloud system.

Figure 7:
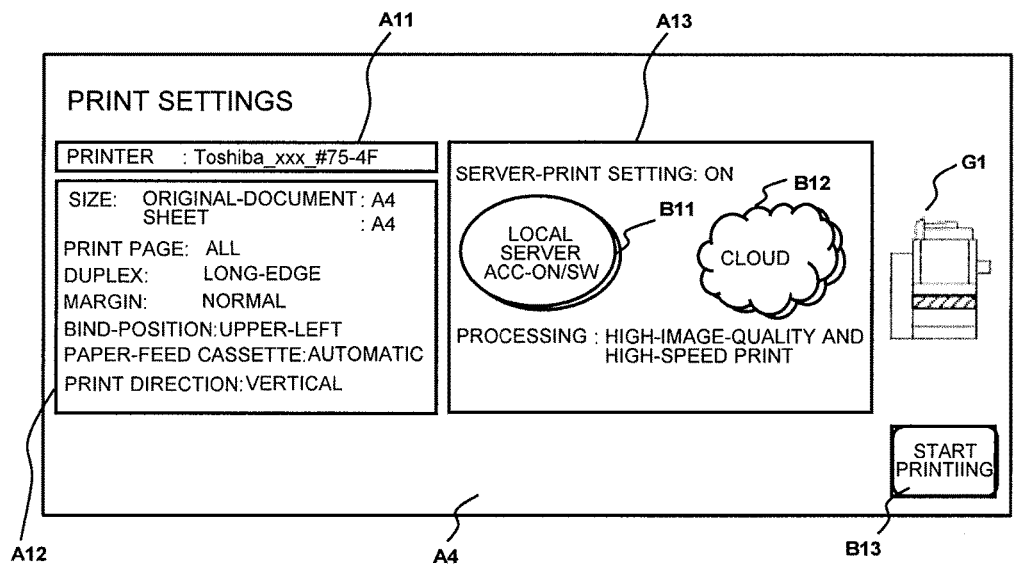
FIG. 7 is an example of what is displayed for print processing according to this embodiment.

FIG. 7 shows a print menu window displayed on the PC 30 during print processing.

The print menu window of FIG. 7 is displayed in cooperation between the driver program preinstalled in the PC and the program of the server 10 according to the flowchart of FIG. 5.

The setting area A11 for selecting a printer or an MFP to print and output, and the setting area A12 for various print settings are displayed on the print menu window.

In this embodiment, the print settings include print size/sheet selection, print page selection, duplex setting, margin setting, bind-position setting, paper-feed tray selection, print direction select, and the like.

Further, similar to the setting area A3 of FIG. 6, the setting area A13 for server setting (server print setting) for print processing (processing for high-load print-image data decompression, etc.) is displayed on the print menu window.

The ON/OFF setting button B11 for local server processing and the selection button B12 for selecting one of the cloud system/local server to process scan-image data are displayed in the setting area A13, and a server-processing type may be set.

According to the example of FIG. 7, the graphic G1, which visually shows the selection status of the selected printer or MFP and its status, is also displayed on the print menu window.

The user of the MFP 20 looks at the graphic G1, and therefore may confirm, for example, the status of the selected paper-feed cassette and the status of installed options such as an ADF and a finisher at a glance.

Note that, in the setting area A11 of the print menu window of FIG. 7, "Toshiba_xxx_#75-4f" is set for a printer to print and output.

In the setting area A12, "A4" is set for the original-document size, "A4" is set for the sheet size, "all" is set for the print page, "long-edge" is set for the duplex, "normal" is set for the margin, "upper-left" is set for the bind-position, "automatic" is set for the paper-feed cassette, and "vertical" is set for the print direction.

In the setting area A13, "ON" is set for the server print setting, and "high-image-quality and high-speed print" is set for the processing.

After various settings, the user presses the start-printing button B13 to instruct to start to print.

As described above, according to this embodiment, even if processing by the cloud system is enabled, the user of the MFP 20 may purposely operate so as not to select processing by the cloud system 40 when he wants to maintain content-confidentiality of processing-target data, and when he wants to cut the cost of use of the cloud system, and because of other reasons.

Further, to the contrary, if processing by the server 10 is selected because of a problem of connection to the cloud system 40, the user of the MFP may operate so as to cancel the print processing by the cloud system 40 and the server 10 in view of problems such as the low-speed processing and the image quality, for example. For example, when the user of the MFP presses the button B2, B3, B11, or B12 again, the print processing by the cloud system 40 and the server 10 is canceled.

Here, determination of possibility of use of the cloud system 40 of ACT002 of FIG. 4 and ACT102 of FIG. 5 will be described with reference to FIG. 8 and FIG. 9.

Figure 8:
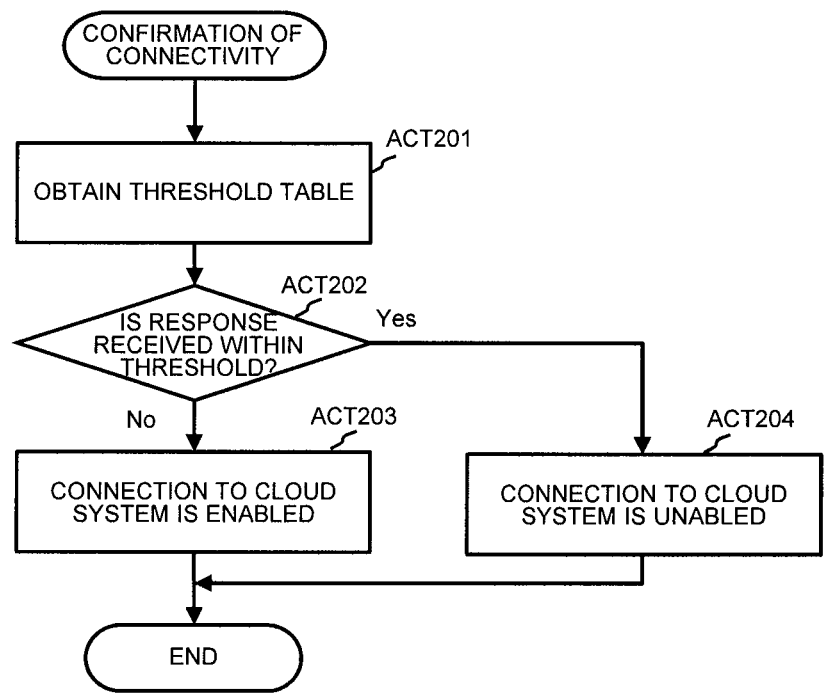
FIG. 8 is a flowchart showing an example of how to confirm connectivity with the cloud system according to this embodiment.

FIG. 8 is a flowchart showing how to confirm connectivity of the server 10 with the cloud system 40. FIG. 9 is a threshold data table used to confirm connectivity.

Because confirmation of connectivity with the cloud system 40 is changed depending on the usage environment, a plurality of time thresholds are prepared as shown in FIG. 9. A manager of the server 10 is capable of switching the time thresholds as necessary.

As shown in FIG. 8, in ACT201 (obtain time threshold), the processor 101 obtains a time threshold set based on the threshold data table of FIG. 9.

In ACT202 (determine if response to request is received within set period of time), the processor 101 sends an execute-processing request to the cloud system 40, and determines if a response to the request is received within the set period of time.

In other words, the processor 101 determines if a response is received within any set period of time, i.e., 1 second, 5 seconds, or 10 seconds, as shown in FIG. 9.

If the response is received within the set period of time (for example, within 5 seconds) (ACT202, Yes), in ACT203 (determine that connection to the cloud system 40 is enabled), the processor 101 determines that connection to the cloud system 40 is enabled.

Meanwhile, if the response is not received within the set period of time (ACT202, No), in ACT204 (determine that connection to the cloud system 40 is unable), the processor 101 determines that connection to the cloud system 40 is unable.

The processor 101 determines the above-mentioned ACT002 and ACT102 based on the determination result.

Figure 10:
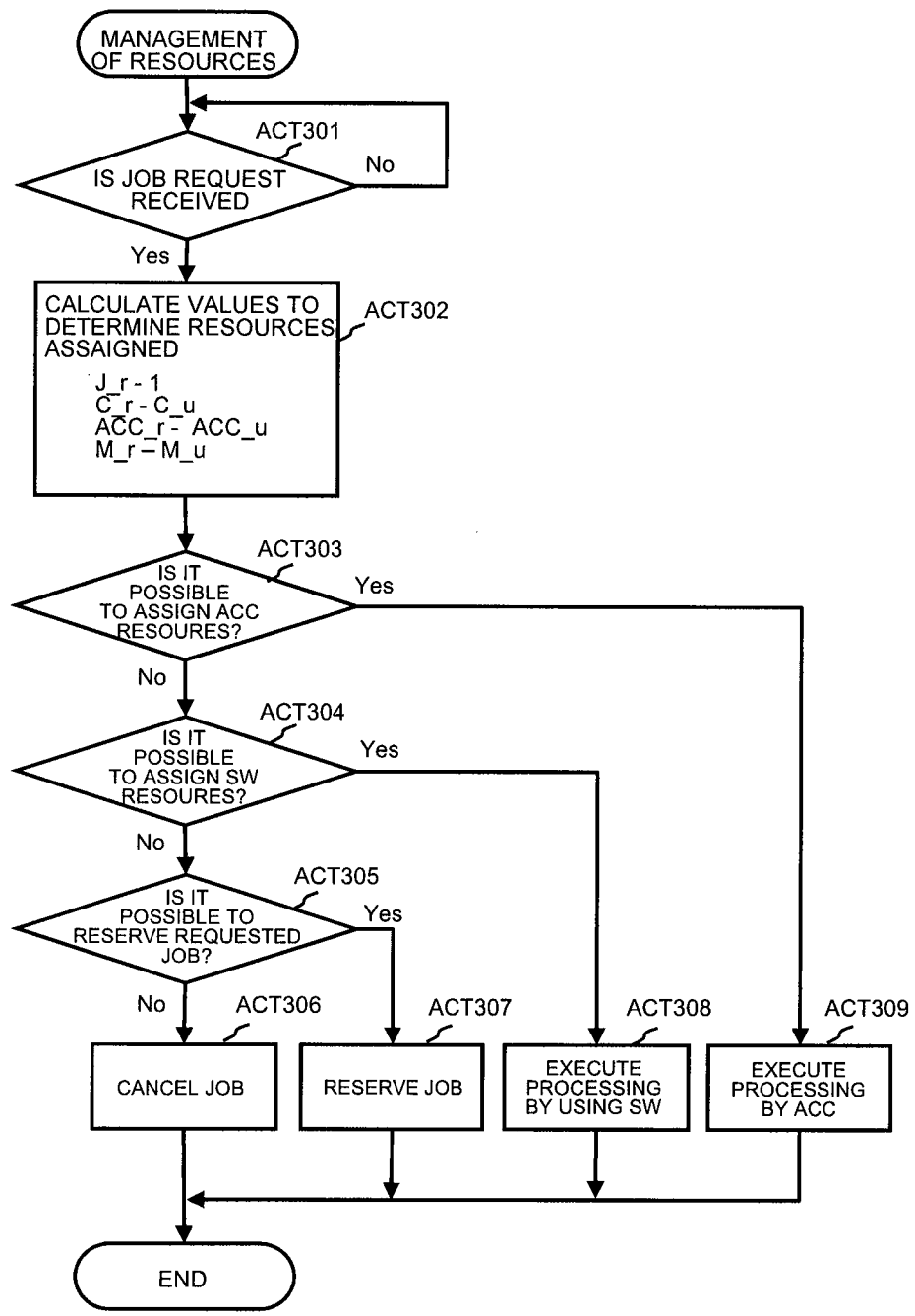
FIG. 10 is a flowchart showing an example of how to manage assignment of the resources according to this embodiment.

FIG. 10 is a flowchart showing an example of how to manage the resources of the server 10. FIG. 11 is a diagram showing a resource-managing data table used to manage the resources.

In this embodiment, if connectivity with the cloud system 40 is not secured and processing by the server 10 is selected, the server 10 confirms if resources are remained to process processing-target data as a new job. If there are remaining resources, the resources are secured.

The resource-managing data table of FIG. 11 is used to manage the remaining number of the cores (number of processor-cores) of the ACC 104 and the processor 101 as the resources of the server 10.

For example, each board of the ACC 104 includes about 2880 cores. So, if 320 cores are assigned to each job such as high-image-quality processing, high-compression processing, and decompression processing of a high-load print image, the server 10 can process 9 jobs at most by using the ACC 104.

According to the example of the resource-managing data table of FIG. 11, the total number of cores, the total number of ACC cores, the total memory volume, the operating resources, the resource remaining amount, and the status of waiting for resources to become available are managed. Further, as the operating resources, the processed job, the number of operating cores, the number of operating ACC cores, and the memory for each operation are managed. Further, as the resource remaining amount, the number of executable jobs, the number of remaining cores, the number of remaining ACC cores, and the remaining memory are managed. Further, as the status of waiting for resources to become available, the number of jobs waiting for resources to become available is managed.

With reference to the flowchart of FIG. 10, an example of how to manage the resources of the server 10 will be described.

In ACT301 (is job request received?) of FIG. 10, the processor 101 stands by until it receives a job (process processing-target data) request (ACT301, No, loop).

If there is a job request (ACT301, Yes), in ACT302 (calculate values to determine resources assigned), the processor 101 calculates a value necessary to assign resources.

In this embodiment, the processor 101 calculates the following numerical values.

(ACT302-1) Value obtained by subtracting 1 from the number of executable jobs (J_r)

(ACT302-2) Value obtained by subtracting the number of cores predicted to use this time (C_u) from the number of remaining processor cores (C_r)

(ACT302-3) Value obtained by subtracting the number of cores predicted to use this time (ACC_u) from the number of remaining ACC cores (ACC_r)

(ACT302-4) Value obtained by subtracting the memory size predicted to use this time (M_u) from the remaining memory size (M_r)

After calculating the above-mentioned numerical values, in ACT303 (determine if it is possible to assign ACC resources), the processor 101 determines if it is possible to assign the resources of the ACC 104.

For example, if the calculated value of ACT302-1 is positive or zero and the calculated value of ACT302-3 is positive or zero, the processor 101 determines that it is possible to assign the resources. If at least one of them is negative, the processor 101 determines that it is impossible to assign the resources.

If it is possible to assign the resources (ACT303, Yes), in ACT309 (execute processing by the ACC 104), the processor 101 causes the ACC 104 to process the requested job.

Note that the number of executable jobs (J_r) and the number of remaining ACC cores (ACC_r) of FIG. 11 are updated before the ACC 104 executes processing actually in ACT006 of FIG. 4 and ACT106 of FIG. 5.

If it is impossible to assign the resources of the ACC 104 (ACT303, No), in ACT304 (determine if it is possible to assign software resources), the processor 101 determines if it is possible to assign the resources (software resources) of the processor 101.

For example, if the calculated value of ACT302-1 is positive or zero and if the calculated value of ACT302-2 is positive or zero, the processor 101 determines that it is possible to assign. If at least one of them is negative, the processor 101 determines that it is impossible to assign.

If it is possible to assign the software resources (ACT304, Yes), in ACT308 (execute processing by using software), the processor 101 processes the requested job by using the software.

Note that, the number of executable jobs (J_r) and the number of remaining cores (C_r) of FIG. 11 are updated before actually executing processing by using the software in ACT012 of FIG. 4 and ACT112 of FIG. 5.

If it is impossible to assign the software resources (ACT304, No), in ACT305 (determine if it is possible to reserve requested job or not), the processor 101 determines if it is possible to reserve the requested job or not.

For example, this determination is made by determining if the number of jobs currently waiting for resource to become available (J_w) is within a predetermined range or not, or by sending a message to a user and determining if an affirmative response is received from the user or not.

If it is possible to reserve the job (ACT305, Yes), in ACT307 (reserve job), the processor 101 adds 1 to the number of jobs waiting for resources (J_w), and registers the job in a queue, for example.

If it is impossible to reserve the job (ACT305, No), in ACT306 (cancel job), the processor 101 cancels the requested job.

Note that, after each job is processed, resources used to process the job are opened. When the resources are opened, the resource-managing data table of FIG. 11 is revised, and the resource remaining amount of the resource-managing data table is returned to the normal remaining amount. As a result, the resources may be used effectively.

As described above, according to the cloud cooperation system of this embodiment, by using a multicore processor more powerful than a general processor for an MFP, it is possible to execute processing at higher speed than processing by an MFP using software.

In other words, the number of jobs supported by software processing is predetermined depending on the volume of a mounted memory and the number of cores of an employed processor. It is possible to manage the jobs supported by a local server based on that number.

Further, the local server processes jobs (processes processing-target data) in order. So as described above, jobs may be reserved and processed in a short time, and a predetermined number of jobs may be managed.

Figure 12:
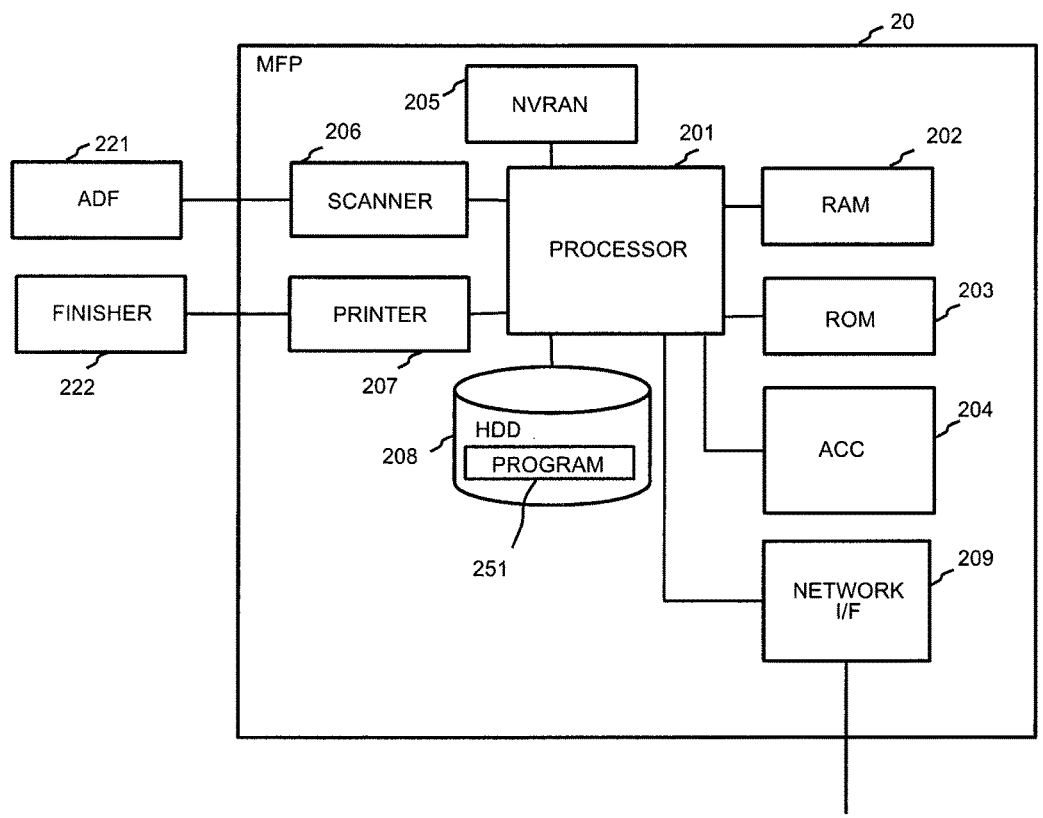
FIG. 12 is a block diagram showing an example of the configuration of the server function of this embodiment is added on an MFP.

FIG. 12 is a block diagram showing that an accelerator, whose function is similar to the function of the ACC 104 added on the server 10, is added on not the server 10 but the system board of the MFP 20.

The MFP 20 of FIG. 12 includes the processor 201, the RAM 202, the ROM 203, the NVRAM (Non-volatile RAM) 205, the scanner 206, the printer 207, the HDD 208, and the network IF 209.

The MFP 20 optionally includes the ADF 221 and the finisher 222, for example.

The MFP 20 further includes the ACC 204 whose function is similar to the function of the ACC 104 of the server 10.

Further, the HDD 208 of the MFP 20 stores the program 251, which is similar to the program 151 installed in the server 10 and to which the OCR function is added. Since semiconductors are processed minutely, operate at higher speed, and the like, a system board may include a dedicated accelerator to realize a higher performance as shown in the MFP 20 of FIG. 12. Further, the MFP 20 may support cooperative operations via a network as necessary. So the MFP 20 is capable of having the above-mentioned functions of the server 10.

According to the cooperation system of this embodiment, the apparatus previously stores the program to realize the above-mentioned processes and functions. Alternatively, the similar program may be downloaded onto the apparatus from a network, or the program recorded in a non-transitory recording medium may be installed in the apparatus. The non-transitory recording medium may be any non-transitory recording medium as long as it can record the program and as long as it is a non-transitory computer readable recording medium. Examples of the non-transitory computer readable recording medium include a CD-ROM and the like.

Further, such preinstalled or downloaded functions may be realized in cooperation with the OS (operating system) and the like of the apparatus.

As described above in detail, according to this embodiment, the cooperation system includes the local server between the MFP and the cloud system, and may continuously realize processing functions at high speed independent of the connection status between the MFP and the cloud system. Further, the cooperation system, as necessary, does not connect to the cloud system when a user wish to do so, and selects the local server to support high-speed processing.

While certain this embodiments have been described, these this embodiments have been presented by way of example only, and are not intended to limit the scope of the inventions. Indeed, the novel this embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cooperation system in cooperation with a cloud system, comprising:
    a server connected to a local network and configured to receive processing target data, the server including:
        an accelerator configured to process the processing-target data,
        a memory storing a program for processing the processing-target data, and
        a processor configured to:
            determine whether the cloud system is available for processing the processing-target data,
            if the cloud system is determined to be available for processing the processing-target data, transfer the processing-target data to the cloud system,
            if the cloud system is determined to not be available for processing the processing-target data, determine whether the accelerator is available for processing the processing-target data,
            if the cloud system is determined to not be available for processing the processing-target data and the accelerator is determined to be available for processing the processing-target data, cause the accelerator to process the processing-target data, and
            if the cloud system and the accelerator are both determined to not be available for processing the processing-target data, process the processing-target data by executing the program; and
    an image processing apparatus connected to the local network, the image processing apparatus being configured to:
        send the processing-target data to the server, and
        receive processed data from the server, the processed data being obtained by processing the processing-target data by one of the server and the cloud system.

2. The cooperation system according to claim 1, wherein:
    the server is further configured to send, to the cloud system, an execute-processing request to process the processing-target data, wherein the processor determines if the cloud system is available to process the processing-target data based on presence/absence of a response from the cloud system within a set period of time in response to the execute-processing request.

3. The cooperation system according to claim 2, wherein the memory stores a threshold data table containing a plurality of time thresholds, and
    the set period of time corresponds to one of the plurality of time thresholds of the threshold data table.

4. The cooperation system according to claim 1, wherein the image processing apparatus is further configured to:
    display a processing-menu window, and
    receive, via an input with respect to the processing-menu window, a selection of one of the server and the cloud system to process the processing-target data.

5. The cooperation system according to claim 1, wherein the server is further configured to, if the cloud system is determined to be available for processing the processing-target data, receive, from the image processing apparatus, an affirmative instruction to proceed with processing of the processing-target data by the cloud system, and
    the processing-target data is transferred to the cloud system in response to the received affirmative instruction.

6. The cooperation system according to claim 1, wherein the server is further configured to, if the cloud system is determined to not be available for processing the processing-target data, receive from the image processing apparatus, an affirmative instruction to proceed with processing of the processing-target data in the server instead of the cloud system, and
    the processing-target data is processed in the server in response to the received instruction.

7. The cooperation system according to claim 1, wherein the processor determines whether the accelerator is available for processing the processing-target data based on a remaining resource of the accelerator.

8. The cooperation system according to claim 7, wherein the processor determines the remaining resource used to process the processing-target data by accessing a resource-managing data table, the resource-managing data table managing the remaining resource of the accelerator.

9. The cooperation system according to claim 1, wherein the server receives the processing-target data from the image processing apparatus, and
    the processor is further configured to:
        determine if the processing-target data contains a certain keyword,
        if the processing-target data is determined to not contain the certain keyword, transfer the processing-target data to the cloud system, and
        if the processing-target data is determined to contain the certain keyword, the processing-target data is processed by one of the processor executing the program and the accelerator.

10. The cooperation system according to claim 1, wherein the processor is further configured to:
    if the cloud system and the accelerator are both determined to not be available for processing the processing-target data, determine whether the processor is available to process the processing-target data by executing the program.

11. The cooperation system according to claim 10, wherein the processor is further configured to:
    if the cloud system, the accelerator, and the processor executing the program are each determined to not be available for processing the processing-target data, determine whether a job including the processing of the processing-target data can be added to a queue for processing by the processor executing the program.

12. The cooperation system according to claim 11, wherein the processor is further configured to:
if the job is determined to be able to be added to the queue for processing by the processor executing the program, register the job in the queue.

13. A server configured to relay processing-target data exchanged between an image processing apparatus and a cloud system, the server comprising:
a processor;
an accelerator configured to process the processing-target data: and
a memory storing a program for processing the processing-target data, wherein the processor is configured to:
determine whether the cloud system is available for processing the processing-target data,
if the cloud system is determined to be available for processing the processing-target data, transfer the processing-target data to the cloud system,
if the cloud system is determined to not be available for processing the processing-target data, determine whether the accelerator is available for processing the processing-target data,
if the cloud system is determined to not be available for processing the processing-target data and the accelerator is determined to be available for processing the processing-target data, cause the accelerator to process the processing-target data, and
if the cloud system and the accelerator are both determined to not be available for processing, process the processing-target data by executing the program.

14. The server according to claim 13, wherein
the server is further configured to send, to the cloud system, an execute-processing request to process the processing-target data, wherein the processor determines if the cloud system is available to process the processing-target data based on presence/absence of a response from the cloud system within a set period of time in response to the execute-processing request.

15. A method of assisting, by a server, an image processing apparatus to execute processing, the server being configured to relay data exchanged between the image processing apparatus and a cloud system connected with each other via a network, the method comprising:
receiving, by the server, processing-target data from the image processing apparatus;
determining, by the server, whether the cloud system is available for processing the processing-target data;
if the cloud system is determined to be available for processing the processing-target data, transferring the processing-target data from the server to the cloud system in order to process the processing-target data by the cloud system;
if the cloud system is determined to not be available for processing the processing-target data, determining, by the server, whether an accelerator included in the server is available for processing the processing-target data;
if the cloud system is determined to not be available for processing the processing-target data and the accelerator is determined to be available for processing the processing-target data, causing the accelerator to process the processing-target data;
if the cloud system and the accelerator are both determined to not be available for processing the processing-target data, processing the processing-target data with a processor of the server executing a program; and
sending processed data from the server to the image processing apparatus, the processed data being obtained by processing the processing-target data by one of the cloud system and the server.

* * * * *